United States Patent [19]

Howard

[11] 4,399,622
[45] Aug. 23, 1983

[54] FLUID INTAKE OPENINGS FOR A SUCTION DREDGER

[76] Inventor: George A. Howard, 453 Waimea Rd., Nelson, New Zealand

[21] Appl. No.: 201,240

[22] Filed: Oct. 27, 1980

[30] Foreign Application Priority Data

Oct. 29, 1979 [NZ] New Zealand .................. 191958

[51] Int. Cl.³ .............................................. E02F 3/88
[52] U.S. Cl. ........................................... 37/57; 37/58;
37/60; 209/250; 209/308; 209/337; 299/8
[58] Field of Search .............. 209/307, 308, 250, 337, 209/342; 299/8, 9; 37/57, 54, 60, 55, 58

[56] References Cited

U.S. PATENT DOCUMENTS

| 247,462 | 9/1881 | Johnson | 209/337 X |
|---|---|---|---|
| 746,089 | 12/1903 | Jessup | 209/307 |
| 748,804 | 1/1904 | Smyth et al. | 37/60 |
| 1,028,387 | 6/1912 | Roberson | 37/57 X |
| 1,055,371 | 3/1913 | Thorp et al. | 37/57 |
| 1,270,142 | 6/1918 | Gage, Sr. | 299/8 |
| 1,394,693 | 10/1921 | Swintek | 37/57 X |
| 1,426,616 | 8/1922 | Swintek | 209/308 X |
| 1,492,817 | 5/1924 | Swintek | 37/57 X |
| 1,584,277 | 5/1926 | Dec | 299/8 |
| 1,731,838 | 10/1929 | Andersen | 37/60 |
| 1,739,326 | 12/1929 | Posselt | 299/9 X |
| 2,643,471 | 6/1953 | Ragsdale | 37/58 |
| 2,894,340 | 7/1959 | Thale | 37/55 |
| 2,929,507 | 3/1960 | Komline | 209/308 X |

FOREIGN PATENT DOCUMENTS

| 971580 | 7/1975 | Canada | 37/58 |
|---|---|---|---|
| 2311315 | 9/1974 | Fed. Rep. of Germany | 209/307 |
| 239458 | 9/1925 | United Kingdom | 37/58 |

Primary Examiner—Clifford D. Crowder
Attorney, Agent, or Firm—Holman & Stern

[57] ABSTRACT

A dredging apparatus is afforded having the improvements of a wedge-shaped dredge foot housing both a fluid opening and a filter member, the intake opening being located on the underside of the dredge foot and the filter member being located above the fluid intake opening so as to be placed between the intake and the suction conduit, the taper of the wedge foot being toward its forward edge and its underside being substantially planar. Also afforded is providing the lower end of the dredge housing with a forwardly directed lever means comprising a lever member capable of being reciprocally moved in order to effect the levering of large objects, thus enabling the location of the intake opening below such objects.

25 Claims, 13 Drawing Figures

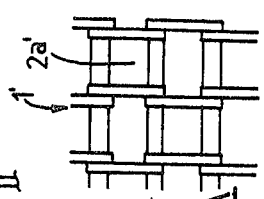
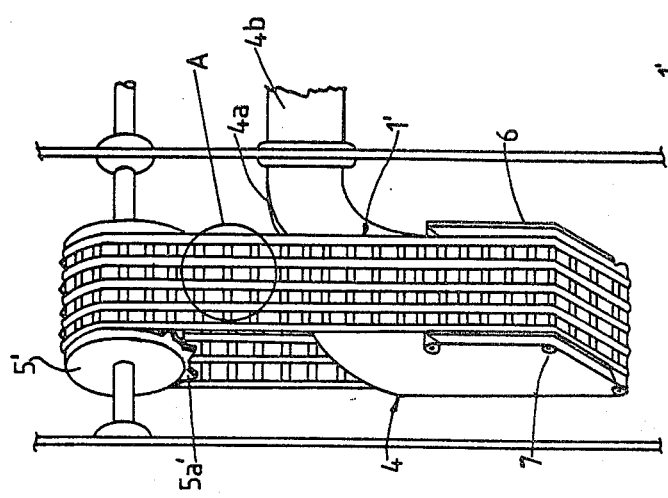
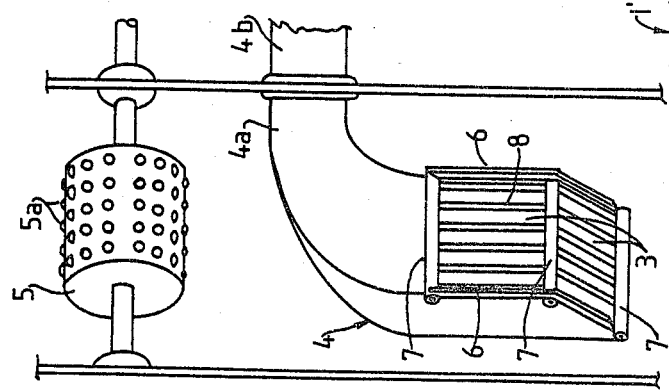
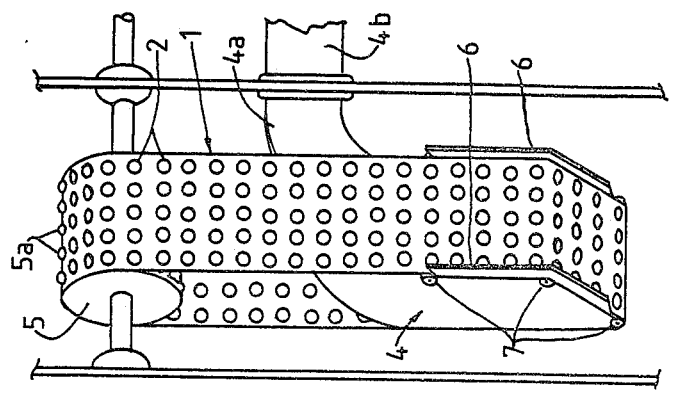

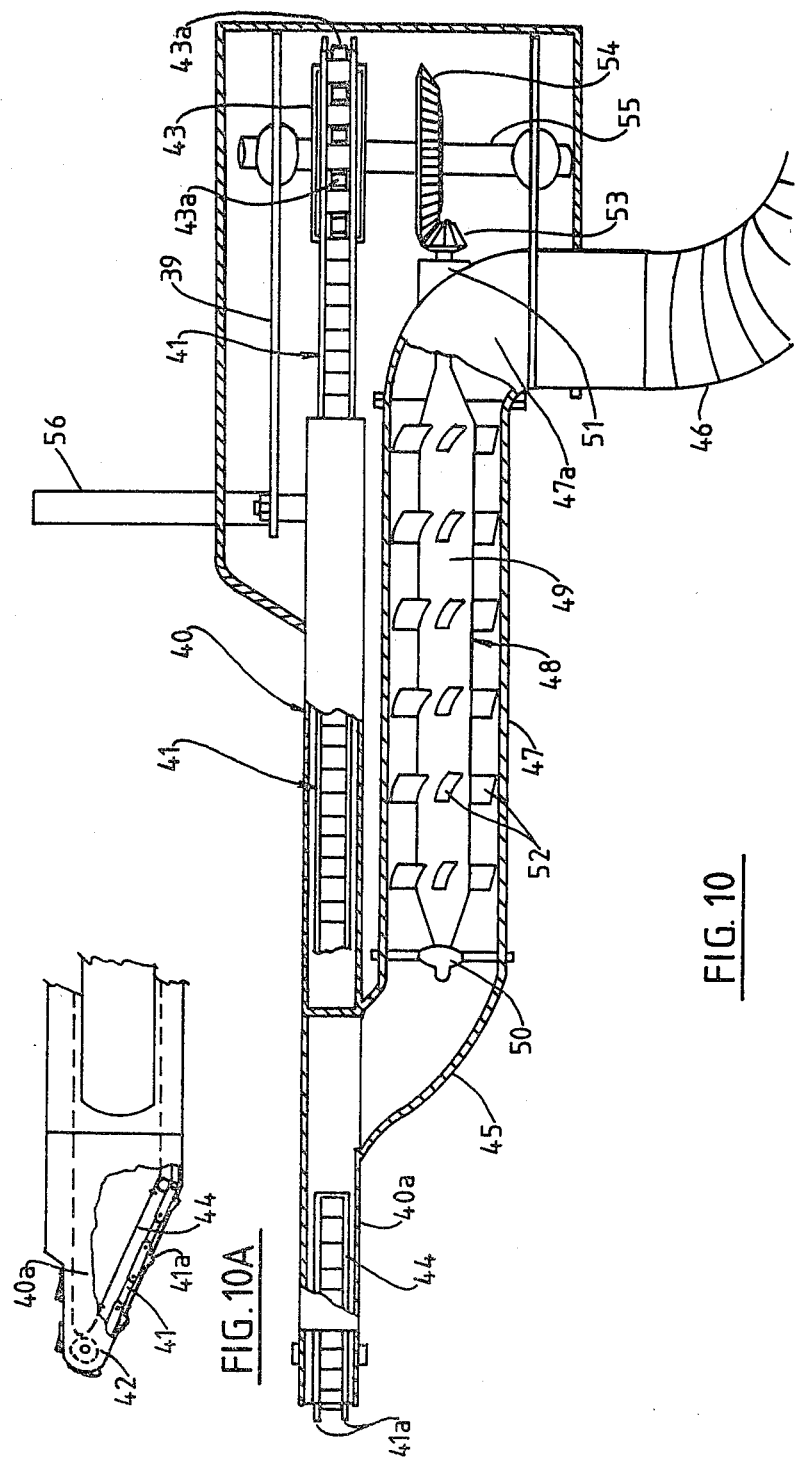

FLUID INTAKE OPENINGS FOR A SUCTION DREDGER

This invention relates to suction dredging apparatus having fluid intake openings, and more particularly relates to means to prevent clogging of such openings and for preliminary grading of dredged material.

It is common to provide fluid intake openings (other than those large enough to allow the passage of most materials without causing blockage), such as water intake openings, with a fixed apertured screen or sieve member to prevent entry into the opening of extraneous objects in excess of the size determined by the size of the apertures, for various purposes e.g. for the purpose of suction dredging under water for the recovery of small solid materials or minerals and/or to prevent damage to or blockage of machinery or equipment as could happen by the intake of objects over the predetermined size.

With such fixed screens however, the apertures therein can be readily and frequently blocked necessitating frequent stoppage of associated equipment for manual clearing of such fixed screens, in some cases necessitating actual removal of the screens for servicing and cleaning.

Accordingly, an object of this invention is to provide a means of mechanically maintaining a filter member at an intake opening clear of obstructions to prevent clogging of said intake opening during operation, and to remove the disadvantages above-mentioned with respect to fixed screens or filter members.

Other objects and advantages of the invention will become apparent from the ensuing description.

According to a first aspect of this invention therefor, there is provided a means for the prevention of clogging of a fluid intake opening comprising at least one filter member having a plurality of regularly positioned apertures therein and arranged to have at least part extend fully over said intake opening, said apertures being arranged to admit fluid to the opening and restrict the ingress of oversized extraneous material, and there being at least one rotatable member having rigid projections locatable in said apertures and means for effecting continual or intermittent relative movement between the filter member and rotatable member to cause clearing of the apertures of the filter member during operation.

According to a second aspect of this invention, there is provided a mouth or intake end unit for a suction pump incorporating the means according to the preceding paragraph.

According to a third aspect of this invention, there is provided suction pump dredging apparatus incorporating the mouth or intake end part and the means for prevention of clogging of the liquid intake opening according to the two preceding paragraphs.

Some preferred aspects of the invention will now be described by way of example and with reference to the accompanying drawings, in which:

FIG. 1 is a diagrammatic perspective view of a fluid intake e.g. a water intake, unit incorporating an endless belt filter screen member in accordance with the invention;

FIG. 2 is a view similar to FIG. 1 but with the belt removed to more clearly show the intake opening and a means for driving the belt filter member and clearing the apertures;

FIG. 3 is a view similar to FIG. 1 but illustrating an endless link chain filter screen member in accordance with an alternative form of the invention;

FIG. 3A is a fragmentary view of the encircled part A of FIG. 3;

FIG. 3B is a view similar to FIG. 3A but showing an alternative link chain arrangement;

FIGS. 10 and 10A are a part-broken plan view and fragmentary side view respectively, of a particular form of intake unit suited to hand manipulation and for use with such pump dredging equipment.

Figure 4:
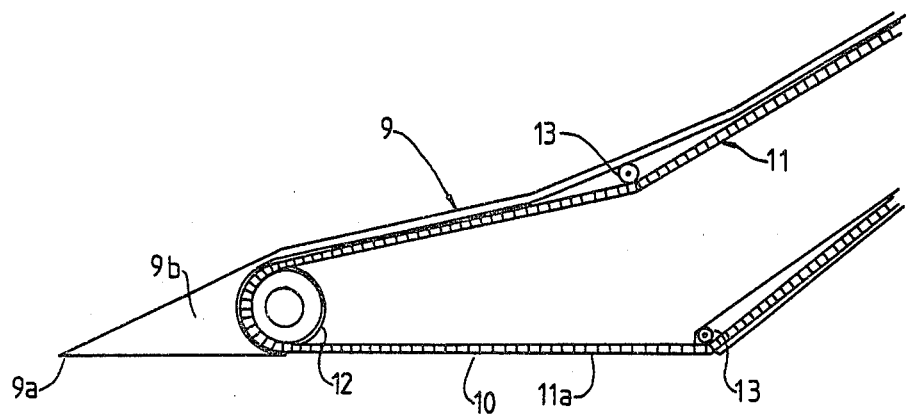
FIG. 4 is a diagrammatic side sectional view illustrating a mouth or intake end part of a unit incorporating the invention and particularly intended for underwater dredging operations.

Referring firstly to FIGS. 1 to 3 (and 3A) of the drawings, the invention may be applicable to fluid intake openings for various purposes, but for convenience by way of example will be referred to as a liquid intake opening. In the first constructions the filter member is an endless loop member of substantially flat formation and may be in the form of the endless flat belt 1 having a plurality of regularly positioned apertures 2 as shown in FIG. 1 of the drawings, or in the form of a multiple transverse link roller chain 1' as shown in FIGS. 3 and 3A of the drawings (a modification of this and illustrated in FIG. 3B being a plurality of similar roller link chains in juxtaposition or any other suitably applicable link chain arrangement without roller connections) with the apertures 2' between the links defining the liquid admitting apertures—a link belt can be similarly employed.

The belt or chain filter member 1 or 1' is mounted for continuous or intermittent movement so that part thereof travels in a path extending over an intake opening 3 of an intake or mouth end unit, generally indicated by the arrow 4, which may for example be the mouth end unit of a liquid suction pump apparatus. In such an arrangement the mouth end unit 4 may be of off-set construction so as to be locatable between the two runs of belt or chain filter member 1 or 1' with the intake opening 3 located adjacent the inner side of the belt or chain filter member, and to have a laterally extending portion 4a coupled or arranged to be coupled to a conduit 4b for the passage of the liquid and any solids contained therein. The mouth end unit 4 can be shaped so that the intake opening 3 presents one or two (as illustrated) or more faces.

In the case of the form of the invention according to FIGS. 1 and 2, the endless belt 1 is located over and arranged to be moved by a driven axially rotatable roller 5 e.g. a steel roller, having a plurality of peripheral rigid projections 5a spaced and dimensioned so as to be locatable in and at least partially through the apertures in the belt filter member 1, to thus provide an arrangement whereby rotation of the roller 5 effects movement of the belt filter member 1 along its prescribed loop path over the intake opening 2, which may be provided with side guide members 6 and one or more transverse idler rollers 7; and the projections 5a of the roller 5, in addition to preventing slip of the belt filter member 1, serve to push out and clear any foreign or oversized objects lodged in any of the filter apertures 2 of the belt filter member 1. The roller can be continually or intermittently rotated by any suitable driving means e.g. by an electric motor, hydraulic motor, internal combustion engine or such as by a water turbine arrangement. The intake opening 3 may be provided with a plurality of spaced grid bars 8 providing support to the belt filter member 1 at the intake opening 3.

The belt filter member 1 may be constructed from such as a thin flexible sheet metal e.g. stainless steel, or from any suitable reinforced or unreinforced flexible material designed and constructed according to the conditions under which it is to operate. It would be appreciated that a flexible belt or thin metal or of other material may not have the durability required for some operations, particularly where abrasive and/or sharp materials are likely to be encountered, and accordingly in many such operations the multiple transverse link steel roller chain 1' such as that illustrated by way of example in FIGS. 3 and 3A of the drawings may be more particularly suitably employed, in such an arrangement a multiple toothed chain roller 5' or a plurality of similar co-axial adjacent chain wheels would be substituted for the roller 5 of the belt arrangement, the teeth 5a' thereof defining the aperture clearing projections; idler sprockets may be utilised in the place of the idler rollers 7 shown in FIGS. 1 and 2 but small diameter idler rollers 7 can be employed in a chain filter member arrangement and can be advantageous in space saving and fitting in confined areas e.g. in sharpened nose-parts of dredging equipment as are hereinafter described.

As an alternative to the multiple transverse link chain arrangement of FIG. 3, it will be appreciated that a plurality of similar single roller chains in contiguous relationship may be utilised (and as mentioned later with reference to FIGS. 10 and 10A of the drawings, it is envisaged that a single endless roller chain can be utilised for smaller operations).

Figure 5:
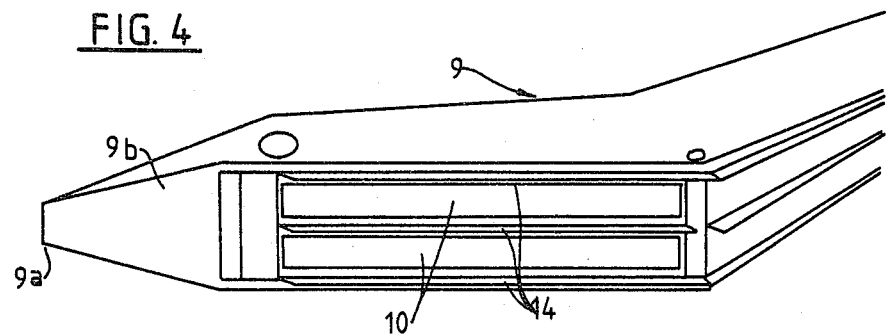
FIG. 5 is an underside perspective view of the arrangement shown in FIG. 4 including lever means.

The invention may be particularly usefully employed in the recovery of minerals such as gold from rivers and sea beds by suction pump dredging of sand, shingle and detritus, and for the recovery by suction dredging of sand and shingle not exceeding a prescribed size; and for such operations and with reference now to FIGS. 4 and 5 of the drawings, a mouth or intake end unit is provided for suction pump apparatus and may include a nose-like housing section, generally indicated by the arrow 9, tapered and fashioned at a leading edge 9a to a point to facilitate the entry of such leading edge 9a into normally less accessible regions e.g. under rocks or other large objects and into crevices. The intake opening 10 is provided at the base of such unit with an endless belt or chain filter element 11 similar to either of those illustrated in FIGS. 1 and 3, 3A located within the housing 9 so that its path includes a lower portion 11a extending over the intake opening 10. A rotatable idler member 12 in the form of a roller for a belt filter member or a chain wheel or wheels for a chain filter member is rotatably located in the forward end part of the nose section, and further small diameter idler rollers 13 (or small diameter sprockets or idler rollers for a chain filter member) are located to the rear end of the intake opening 10 for upper and lower runs of the filter member 11 to permit the remainder of the filter member 11 to extend upwardly through the housing 9 to a driving means e.g. a driving roller or chain wheel arrangement (not shown in FIGS. 4 and 5). In the case of an apertured belt filter member, the driven and/or idler roller 12 can be provided with projections as described with reference to FIGS. 1 and 2 for clearing the apertures of the filter member 11.

The leading nose end part 9b can be solid or strengthened and the housing may be provided on its underside with strengthening and guide rails or bars 14 extending longitudinally thereof to enable the nose unit to operate in and be able to withstand rough treatment from hard rocky material; and additionally the longitudinal bars may serve to divide the intake opening 10 into two or more areas, and to protect the filter member 11 and to maintain the intake opening 10 and filter member 11 marginally clear of the water bed or any flat objects so that water and small sized material carried thereby is not prevented from entering the intake opening 10.

Figure 6:
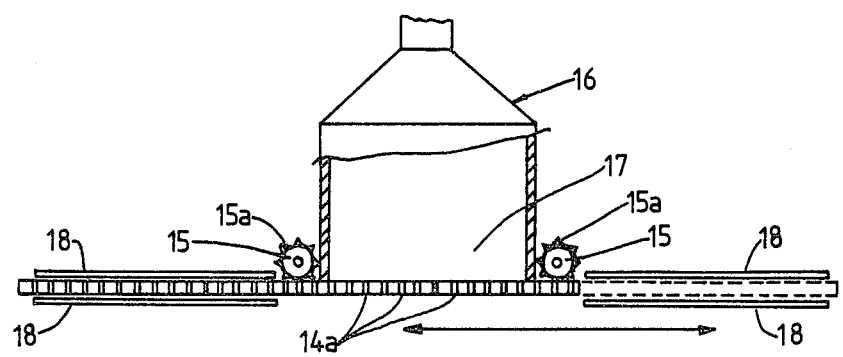
FIG. 6 illustrates a modification of the invention incorporating a reciprocally movable filter member.

An endless belt or endless chain arrangement of filter member can be most conveniently and usefully employed in accordance with the invention, but in a modification of the invention it is envisaged that the filter member may be arranged for reciprocal movement across an intake opening instead of the continuous or intermittent one-way movement of a belt or chain arrangement as aforedescribed. Accordingly, and with reference now to FIG. 6 of the drawings, it is envisaged that the filter member 14 can be in the form of a flat plate provided with a plurality of regularly spaced apertures 14a of predetermined size, and such plate filter member 14 can be reciprocally movable transversely over the intake opening by any suitable means; and at least one toothed roller 15 is rotatably located adjacent the housing 16 defining the intake opening 17 and has a plurality of peripheral teeth or like projections 15a dimensioned and arranged to locate in and at least partially through the apertures 14a of the plate member 14 so as to clear such apertures 14a of debris during reciprocal movement in a similar manner to the clearing of the apertures 2, 2' in the previously described belt filter member 1 or chain filter member 1'. The plate filter member 14 is slidably located in suitable guides 18, and there can be a similar toothed roller 15 at each side of the housing 16 for engagement with the plate filter member 14. To effect reciprocal movement of the plate filter member 14, one of said toothed rollers 15 can be intermittently rotated in one direction and then in the opposite direction to move the plate filter member 14 fully over the intake opening 17 and ensure that all apertures 14a of the filter member 14 are cleared; or it is envisaged that the toothed roller 15 (or rollers 15) may idle and reciprocation of the plate filter member 14 can be effected such as by operation of an attached hydraulic ram unit, or by some other means remote from the intake unit 16. The location of the toothed roller 15 or rollers 15 adjacent the intake housing unit 16 and externally thereof provides for easy excess and insertion of the teeth 15a thereof into the apertures 14a from the inner side of the filter member 14, but where the plate filter member 14 is reciprocated such as by a hydraulic ram unit or mechanical means other than the toothed roller 15, it may in some cases be preferred to locate the aperture clearing roller(s) 15 on the inner side of the housing 16 adjacent the intake opening 17. As a further modification of the invention (not illustrated) it is envisaged that a similar apertured plate filter member 14 can be fixed over the intake opening 17 and a toothed roller 15 reciprocally moved and rotated over the filter member and within the housing 16.

Figure 7:
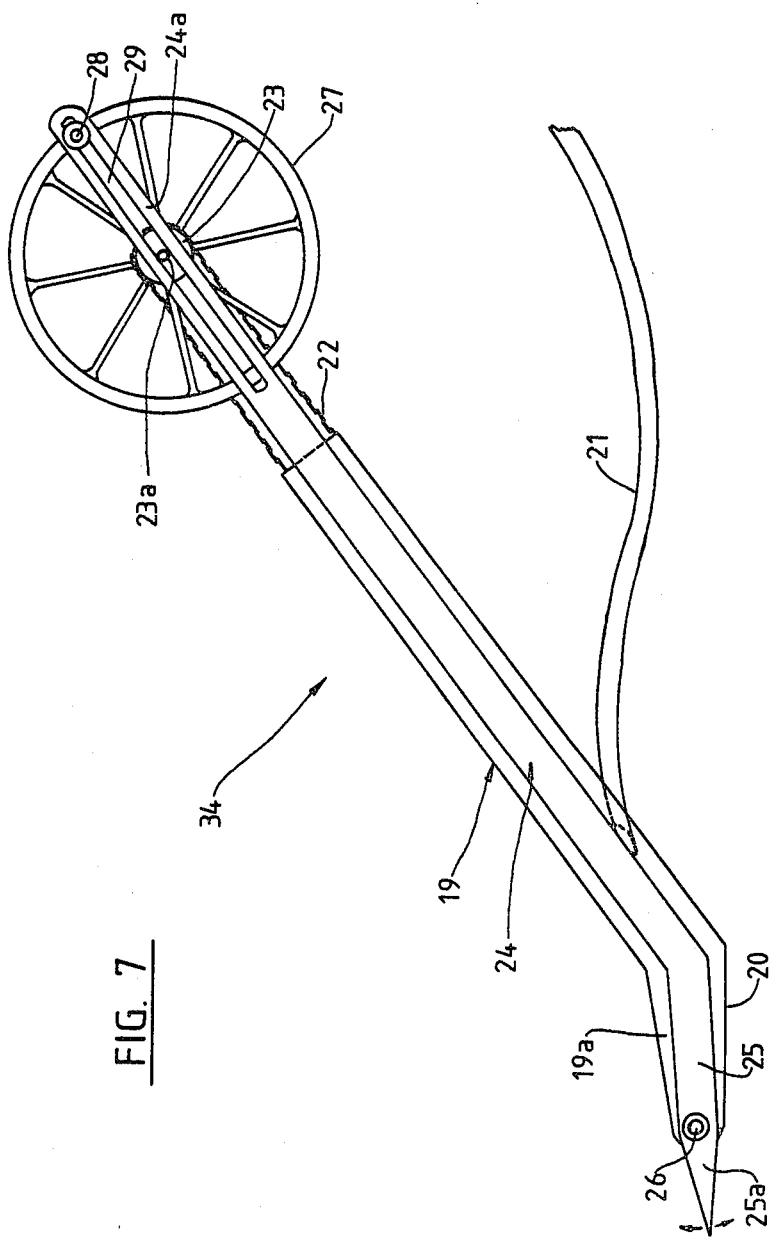
FIG. 7 is a part-broken side elevational view of a lower end unit incorporating a mouth or intake end in accordance with the invention and particularly intended for underwater dredging operations such as gold or other mineral dredging operations.

As previously indicated, the invention is particularly applicable to underwater dredging operations and apparatus including a suction pump unit for the recovery of gold or other minerals, and one form of the invention further includes an oscillating lever arrangement to enable partial lifting or moving of heavy objects, or digging under such objects, to enable location of at least part of the intake opening under such objects, as such areas or like crevices are the areas in which minerals sought are inclined to collect. Accordingly, one example of this form of the invention is shown in FIG. 7 of the drawings and is a unit 34 including an elongate housing, generally indicated by the arrow 19, normally inclined so as to extend from the water bed upwardly and the lower end of such housing is provided with a cranked forwardly extending nozzle end part 19a with the intake opening 20 at the base thereof and a suction conduit 21 extending from such nozzle end part 19a upwardly to suction pump apparatus (not shown in FIG. 7). An endless belt or chain filter member 22 such as that previously described and illustrated is located within the housing 19 to extend upwardly and be located about a rotatable driving or driven member e.g. a driving roller or chain wheel 23. A cranked elongate lever member, generally indicated by the arrow 24, is located adjacent the housing member 19 and nose end part 19a and has a lower leading end part 25 pivotally connected at the nose end part 19a of the housing 19 e.g. on the same axis 26 as the axis of rotation of a leading idler roller or chain wheel within the housing nose end part 19a for the endless loop filter member 22, to have a sharpened or tapered leading end 25a forwardly of such axis 26 with the remaining major part of the lever member 24 extending rearwardly and upwardly from the pivot axis 26 to a means for effecting movement of the upper end part 24a of the lever member 24 and thus a smaller oscillating movement of the tapered leading end 25a of the lever 24, which may be readily locatable under large rocks or other objects. Movement of the upper end part 24a of the lever member 24 can be effected such as by a crank wheel 27, which can be rotatably mounted on the same axle 23a as the upper driving roller or chain wheel 23, having a peripheral lateral trunnion or like projection 28 slidably located in an elongate slot 29 of the upper end part 24a of the lever member 24 so that rotation of the crank wheel 27 and sliding of the trunnion 28 in the lever slot 29 will effect reciprocal or oscillating movement of the upper end part 24a of the lever member 24.

Figure 8:
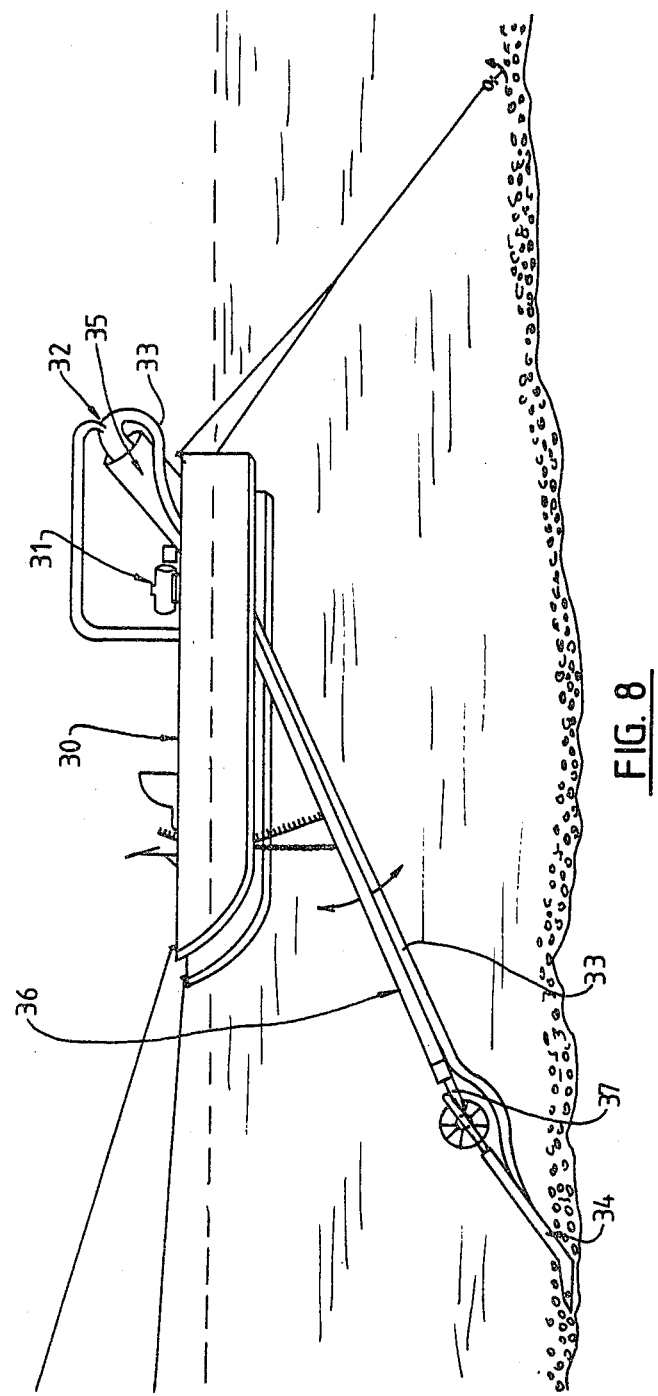
FIG. 8 is a side elevational view of dredging apparatus in accordance with the invention and employing the unit according to FIG. 7 of the drawings.
Figure 9:
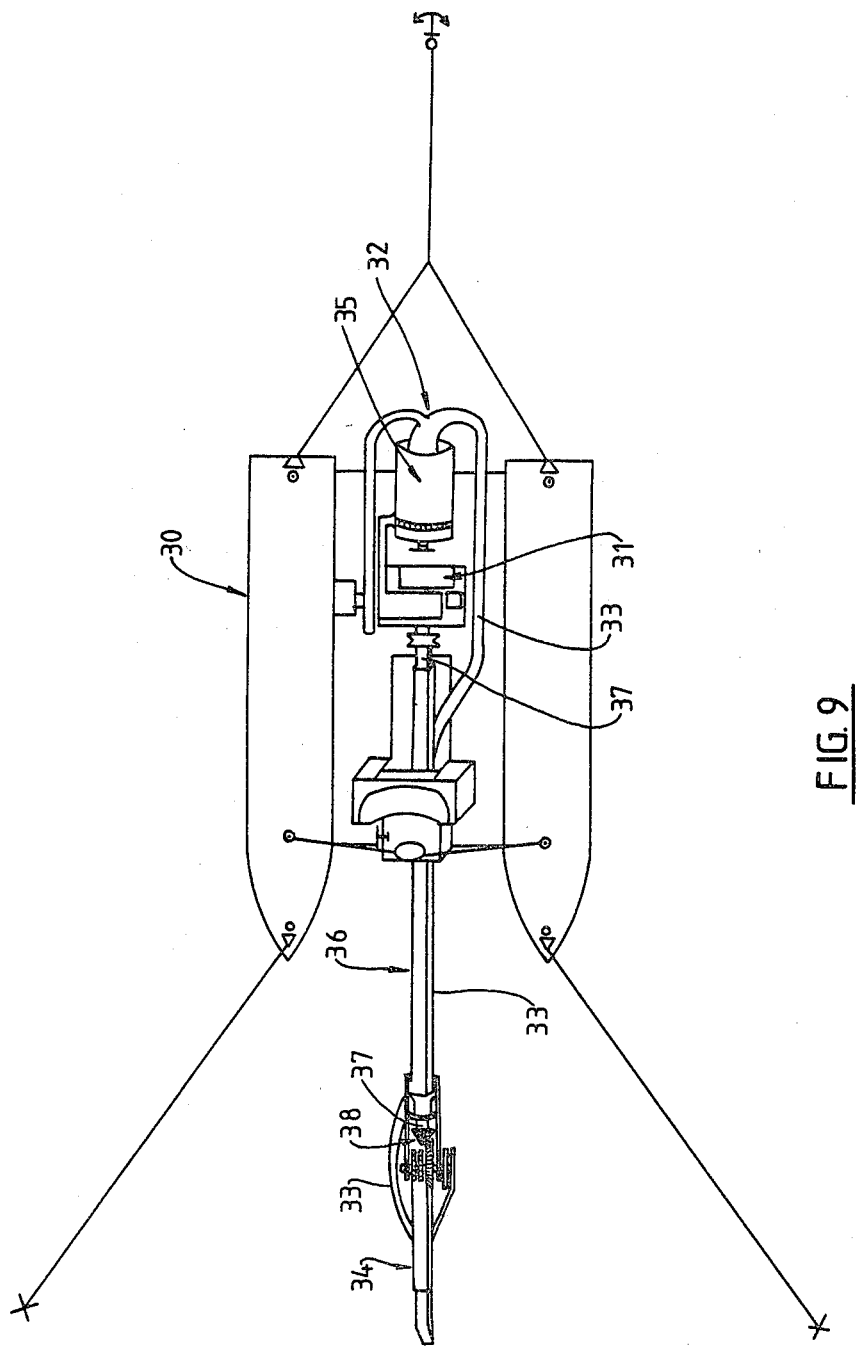
FIG. 9 is a plan view of the apparatus shown in FIG. 8.

An example of dredging apparatus incorporating the invention is shown in FIGS. 8 and 9 and may include a raft or pontoon or like supporting structure 30 supporting suction pump machinery 31 and preferably incorporating ancilliary venturi apparatus 32 to which a suction pipe 33 leading to the dredging nozzle or intake end unit 34 is connected for maximum suction and dredging effect; and the apparatus may include such as a rotary screen 35 for further screening of materials dredged from the water bed, as may be required. A dredge arm 36, which may be of fixed length or may be extendable telescopically or by means of add-on sections, depends from the support structure 30 and may be angularly adjustable relative thereto; and such dredge arm 36 has the mouth or intake end unit 34 provided at the lower end thereof; and as illustrated by way of example the unit 34 according to FIG. 7 may be located at the lower end part of such dredge arm 36 and also be further angularly adjustable relative to such arm such as by mechanical link means or hydraulic connections. The dredge arm 36 can be in the form of a duct or sleeve housing a drive shaft 37 which has its upper end driven by machinery on the support structure 30 and its lower end engaged with such as a bevelled gear arrangement 38 for driving the drive roller or chain wheel 23 for the endless loop filter member 22.

The intake units and the incorporated filter members with aperture clearing means are not confined to any particular size and may be constructed for small operations or large scale operations, and the principles of construction and operation may be applicable for example to sludge and slurry pumps, to water intakes in such as hydro-electric power schemes, the intake units of water jet craft, and cooling water inlets for many types of aquatic craft, particularly those required to operate in shallow or swampy areas.

For the one useful application of the invention to mineral recovery, the invention may be employed in a small hand manipulated unit which may be handled by such as a diver, and one form of such an application of the invention is illustrated by way of example in FIG. 10 of the drawings. In this construction the hand unit includes a frame 39 and intake housing assembly 40 mounting a single roller chain 41 rotatable about a chain sprocket or roller idler member 42 at the forward or leading end 40a of the housing assembly 40 and a rear driving chain sprocket 43. The housing assembly 40 is provided at its forward lower side with an intake opening 44 and a side entry connection 45 is arranged to communicate with a flexible conduit 46 to a suction pump. In the form of the invention illustrated, the chain forming the filter member 41 is arranged to be driven by water power utilising the water suction created to draw in water carrying mineral and other small solids, and to this end a section of pipe 47 between the housing intake connection 45 and the flexible conduit 46 may rotatably house a water turbine member, generally indicated by the arrow 48, comprising a longitudinally disposed shaft or cylindrical part 49 axially rotatable in front and rear bearings, 50 and 51 respectively, and having a plurality of laterally projecting vanes or impeller blades 52 thereon; the rear end part 47a of side pipe section 47 being angled relative to the remainder so that the rear bearing 51 is located thereon and a rear end extension 49a of the shaft or cylindrical part 49 projects therethrough to be provided with a small beveled gear 53 meshing with a larger bevelled gear 54 located on a transverse shaft 55 on which the drive chain sprocket 43 is located, so that as water is drawn through the pipe 47 in operation of the device the turbine member 48 is rotated to effect rotation of the gears 53, 54 and drive chain sprocket 43 to continuously effect movement of the chain filter member 41.

The chain filter member 41 can be located wholly within the housing assembly 40 so that the lower path of the chain within the housing assembly 40 passes over the intake opening 41 fom the inner side in a manner similar to that previously described with reference to FIGS. 4, 5 and 7; but preferably the chain filter member 41 has at least some of its links formed as or provided with cutting or abrading projections 41a which may be used to scratch and loosen up material at the point of intake, and in such an arrangement at least the forward part of the lower run of the chain filter member 41 may run on the outer underside of the housing assembly 40 to have such forward part of the lower run passing in close proximity to the intake opening 44. For the protection of the diver however, the upper run and the rear part of the lower run preferably extend within the housing assembly 40 leaving the leading or forward end part of the chain 41 and lower end part adjacent the intake opening 44 exposed for the scratching and loosening purpose as referred to. As before, the teeth 43a of the chain wheels or sprockets will maintain the fluid admitting apertures between the chain links clear of debri which otherwise might clog a fixed filter or screen. The housing assembly 40 can be provided with appropriate chain guides, runners and/or intermediate idler rollers as may be required for direction changes, and a handle or handgrip member 56 can be mounted to one side (as shown) and/or a handgrip formed at the rear end to assist a user.

Some particular forms of the invention have been described and illustrated by way of example, but it will be appreciated that many variations of and applications of the invention can take place without departing from the scope of the appended claims. For example it will be appreciated that a single movable filter member in accordance with the invention can pass over and serve a plurality of intake openings for one or more intake units, and that banks of units each incorporating a filter member and intake opening can be utilised.

I claim:

1. In a dredging apparatus comprising a fluid intake opening located at the lower end of a housing arranged to depend from an upper support structure at or above water level, said support structure supporting a suction pump means and a conduit extending downward therefrom to said intake opening for the passage to a receiving station of fluid and solids admitted to the intake opening, wherein a filter screen member is disposed so as to extend over said fluid intake opening and to restrict the ingress of oversized extraneous material, said filter member having motion means operatively associated therewith for providing intermittent or continual movement of the filter member relative to the fluid intake opening and for clearing the apertures of the filter member during operation, the improvement comprising:

a wedge-shaped dredge foot housing both the fluid intake opening and the filter member, said intake opening being located on the underside of said dredge foot and said filter member being located above said fluid intake opening so as to be placed between said intake and said conduit, the taper of said wedge being toward the forward edge of said dredge foot and the underside of said dredge foot being substantially planar.

2. The dredging apparatus of claim 1 with the further improvement comprising a foot housing located on its underside with strengthening and guide rails extending longitudinally thereof, which rails serve to divide the intake opening into at least two areas, to protect the filter member, and to maintain the intake opening and filter member marginally clear of the water bed.

3. The dredging apparatus of claim 1 with the further improvement comprising a strengthened leading end of said dredge foot.

4. In a dredging apparatus comprising a fluid intake opening located at the lower end of a housing arranged to depend from an upper support structure at or above water level, said suppoer structure supporting a suction pump means and a conduit extending downward therefrom to said intake opening for the passage to a receiving station of fluid and solids admitted to the intake opening, wherein a filter screen member is disposed so as to extend over said fluid intake opening and to restrict the ingress of oversized extraneous material, said filter member having motion means operatively associated therewith for providing intermittent or continual movement of the filter member relative to the fluid intake opening and for clearing the apertures of the filter member during operation, the improvements comprising:

a lower end of said housing with a forwardly directed lever means comprising a lever member capable of being reciprocally moved to effect levering of large objects to enable location of the intake opening below said objects; and a wedge-shaped dredge foot housing both the fluid intake opening and the filter member, said intake opening being located on the underside of said dredge foot and said filter member being located above said fluid intake opening so as to be placed between said intake and said conduit, the taper of said wedge being toward the forward edge of said dredge foot and the underside of said dredge foot being substantially planar.

5. The dredging apparatus of claim 4 with the further improvement comprising the lower forward end of said level member pivotally mounted near a leading end of the intake opening to afford the capability of oscillating movement about a transverse pivot axis.

6. The dredging apparatus of claim 5 with the further improvement comprising a lever member with a tapered leading end portion forward of the pivot axis and a major elongate portion cranked and extending upwardly adjacent the housing, the upper end of which is connected to a means for effecting movement thereof to cause oscillation of the lever tapered end portion.

7. Suction dredge apparatus comprising a hollow head or mouth end part with a tapering forwardly extending nose and a fluid intake opening on the lower side through which liquid, small objects and solid materials can be drawn for conveyance to a receiving station, there being a movable aperture filter screen located and mounted for movement relative to at least one rotatable member having projections locatable in said screen apertures and over said opening to restrict the size of objects and solid materials passing into the mouth end part and means to prevent accumulation of debris and oversized extraneous materials on the screen surface, and there being a lever means having a sharpened end part directed forwardly of the mouth end part nose and arranged for reciprocal movement to engage and dislodge larger objects and materials encountered by the dredge mouth end part.

8. The suction dredge apparatus of claim 7 wherein said mouth end part is located at a lower end of an elongate housing arranged to depend from an upper support structure at or above water level, said support structure supporting a suction pump and operating mechanism therefor and there being a flexible conduit extending therefrom down to said mouth end part for the passage to a receiving station of fluid and solids admitted to the intake opening.

9. The suction dredge apparatus as of claim 8 wherein the housing is angularly adjustable relative to the support structure.

10. The suction dredge apparatus of claim 8 wherein said lever means comprises an elongate lever member having a lower forward end part pivotally mounted at or near the forward end of the intake opening for oscillating movement about a transverse pivot axis, said lever member having a tapered leading end portion forwardly of the pivot axis and a major elongate portion cranked and extending upwardly adjacent the housing to have its upper end connected to mechanism for effecting movement thereof to cause oscillation of the lever tapered end portion.

11. The suction dredge apparatus of claim 1, 4 or 7 wherein the filter screen comprises an endless flat surfaced belt located about a pair of aligned rotatable rollers at least one of which is arranged to be driven to rotate about its axis and move the belt in its prescribed path, the apertures in said belt filter member being regularly spaced and at least one of said rollers being the rotatable screen clearing member and being provided with a plurality of peripheral surface projections for clearing the belt apertures, said projections being dimensioned and positioned so as to be locatable in said apertures as rotation of the rollers and movement of the belt takes place.

12. The suction dredge apparatus of claim 11 wherein the belt filter screen is a link belt in which the links define the fluid intake opening.

13. The suction dredge apparatus of claim 1, 4, or 7 wherein the fluid screen comprises at least one endless link chain located about a pair of aligned rotatable toothed chain wheels at least one of which is arranged to be driven, the link formation defining said fluid intake opening and at least one of the chain wheels constituting the rotatable screen clearing member with the teeth of the chain wheel defining projections for continually clearing said apertures during rotation of the wheels and movement of the chain.

14. The suction dredge apparatus of claim 1, 4, or 7 wherein the filter screen comprises a plurality of similar endless link chains located about a first set of co-axial rotatable toothed chain wheels and about a second aligned set of co-axial rotatable chain wheels, the link formations of the chains defining said fluid intake opening and the teeth of the chain wheels defining projections for continually clearing said apertures during rotation of the chain wheels and movement of the chains.

15. The suction dredge apparatus of claim 1, 4, or 7 wherein the filter screen comprises a multiple transverse link chain located about first and second aligned rotatable chain wheels, the link formations of the chains defining said fluid intake opening and the teeth of the chain wheels defining projections for continually clearing said apertures during rotation of the chain wheels and movement of the multiple link chain.

16. The suction dredge apparatus of claim 13 wherein at least some of the chain links have a cutting and abrading surface directed outwardly of the intake opening when passing thereover in operation.

17. The suction dredge apparatus of claim 14 wherein at least some of the chain links have a cutting and abrading surface directed outwardly of the intake opening when passing thereover in operation.

18. The suction dredge apparatus of claim 15 wherein at least some of the chain links have a cutting and abrading surface directed outwardly of the intake opening when passing thereover in operation.

19. The suction dredge apparatus of claim 1, 4, or 7 wherein the filter screen includes a substantially flat part having the plurality of fluid admitting apertures and said flat part is arranged to be reciprocally moved across said intake opening.

20. The suction dredge apparatus of claim 19 wherein the filter screen is a substantially flat plate having its apertures regularly spaced, and the rotatable member being a roller rotatably mounted in juxtaposition with said plate and said intake opening and having a plurality of peripheral projections or teeth locatable in said plate apertures to continually clear the apertures as reciprocation of the plate takes place.

21. A portable mineral dredging unit comprising a frame and housing assembly mounting an endless link chain located about aligned chain wheels at least one of which has teeth locatable in and at least partially through apertures between the chain links and is arranged to be driven by drive transmission means associated with the unit, said housing defining a chamber to which suction can be applied for the collection of dredge material and having an intake opening at a leading end for intake of said material, the link chain passing over and adjacent said intake opening by way of guide means and defining a movable filter screen with said link apertures controlling the particle size of material drawn into the chamber and said aperture being maintained clear of oversized material and objects by said chain wheel teeth, said drive transmission means being actuable by water flow through the housing on application of suction thereto.

22. The dredging unit of claim 21 wherein suction is applied to the housing chamber by way of a second communicating cylindrical chamber rotatably housing a water turbine coupled to the drive transmission means at least part of which is located externally of the second chamber, said second chamber being arranged to be coupled to a suction conduit through which water and particulate material carried thereby can be passed to a receiving station for the material.

23. The dredging unit of claim 21 or 22 wherein the link chain is located wholly within the housing assembly so that one path of the chain passes over the intake opening on the inner side thereof.

24. The dredging unit of claim 21 or 22 wherein at least a leading part of the chain path locates the chain outside the housing assembly at the intake opening so that the chain links are exposed and can be employed to disturb and loosen material to be drawn into the chamber intake opening.

25. The dredging unit of claim 24 wherein at least some of the chain links are provided with outwardly directed cutting/abrading projections for loosening material adjacent the intake opening.

* * * * *